H. EINUNG.
ATTACHMENT FOR FORD AUTOMOBILES.
APPLICATION FILED SEPT. 15, 1917.
1,271,871.
Patented July 9, 1918.
2 SHEETS—SHEET 1.
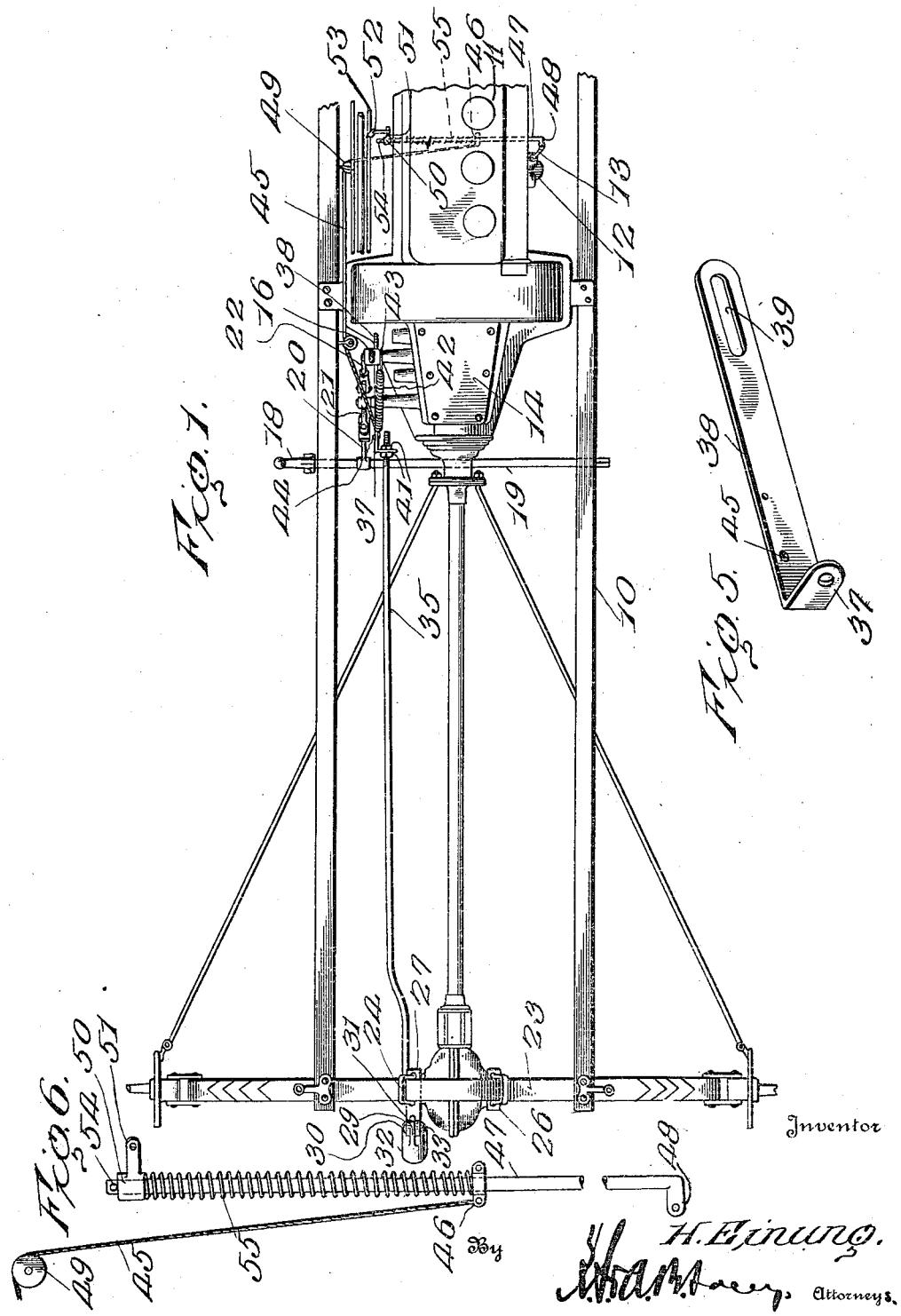

H. EINUNG.
ATTACHMENT FOR FORD AUTOMOBILES.
APPLICATION FILED SEPT. 15, 1917.
1,271,871.
Patented July 9, 1918.
2 SHEETS—SHEET 2.
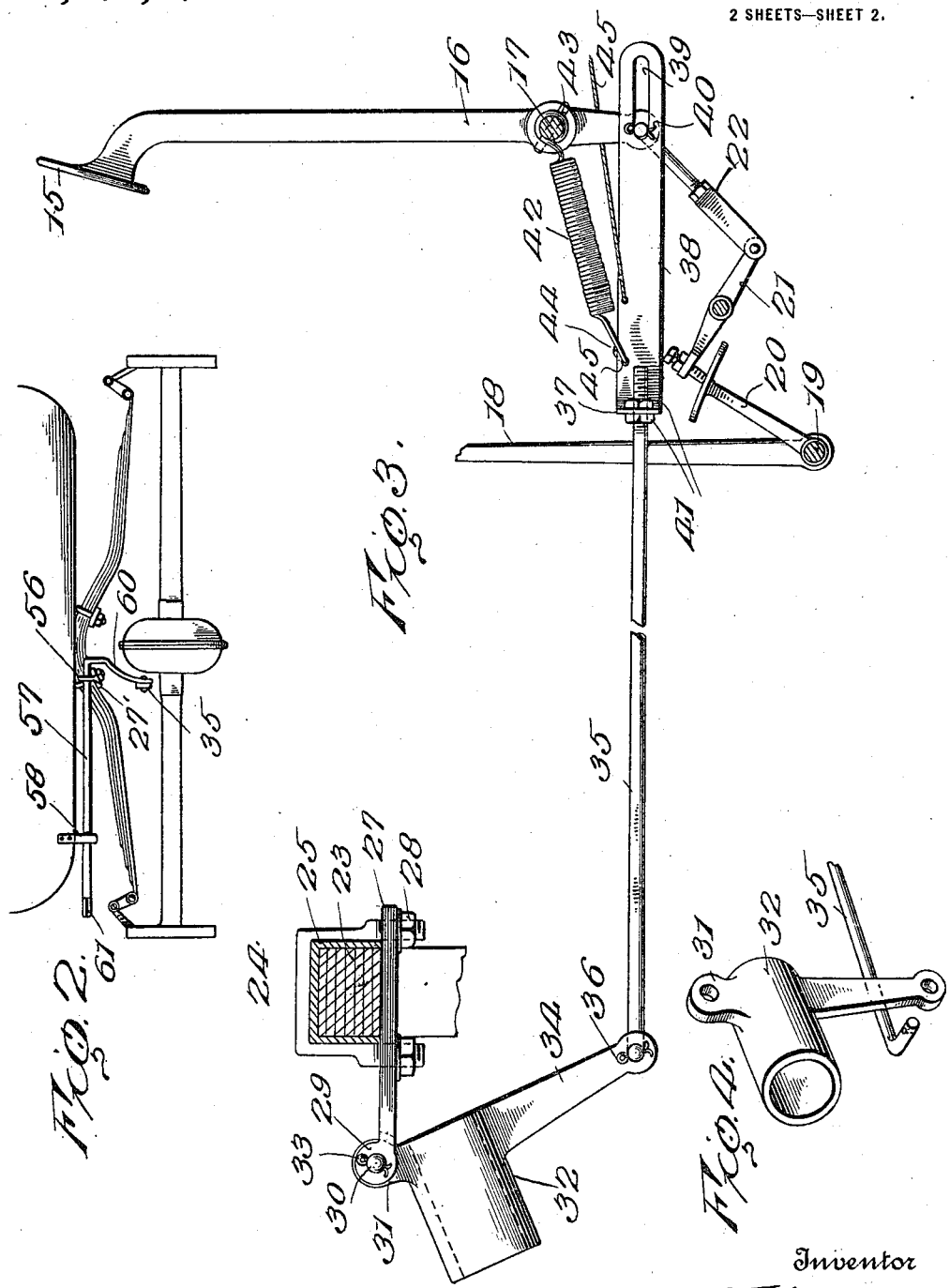

UNITED STATES PATENT OFFICE.

HENRY EINUNG, OF JASPER, MINNESOTA.

ATTACHMENT FOR FORD AUTOMOBILES.

1,271,871. Specification of Letters Patent. Patented July 9, 1918.

Application filed September 15, 1917. Serial No. 191,599.

*To all whom it may concern:*

Be it known that I, HENRY EINUNG, a citizen of the United States, residing at Jasper, in the county of Pipestone and State of Minnesota, have invented certain new and useful Improvements in Attachments for Ford Automobiles, of which the following is a specification.

My invention relates to new and useful improvements in attachments for automobiles and more particularly to attachments for Ford automobiles, the primary object of my invention being the provision of an improved device for assisting in extracting a Ford car from mud holes, sand or the like when either due to slipping of the wheels or lack of power of the engine the car cannot extract itself.

More specifically the object of my invention consists in providing a clutch pedal and throttle valve controlling mechanism so arranged and disposed that it may be operated from the rear of the vehicle so that the driver of the car may get out behind the vehicle and push and still have control over the clutch and engine.

In this connection another object which I have in view is to so construct and arrange the parts that the driver may set the transmission gearing in neutral by bringing the emergency brake lever to vertical or intermediate position to thus lock the clutch pedal against movement to high speed position and may then control the vehicle from the rear.

A further object resides in providing a mechanism operable by a hand lever or the equivalent at the rear of the vehicle for first opening the throttle valve of the carbureter to speed up the engine and for then swinging the clutch pedal to bring the transmission to low speed condition. Inasmuch as the operator may readily accomplish this with one hand at the rear of the car it will be apparent that he can at the same time conveniently push against the car to assist the engine in extracting it.

With these and other objects in view, my invention will be more fully described, illustrated in the accompanying drawings and then specifically pointed out in the claims which form a part of this application.

In the drawings:

Figure 1 is a fragmentary plan view of the chassis of a Ford automobile showing my invention applied thereto;

Fig. 2 is a fragmentary rear elevation of the vehicle;

Fig. 3 is a fragmentary side elevation of the device showing the manner of connecting it to the clutch pedal and of supporting it upon the rear spring of the vehicle;

Fig. 4 is a perspective view of the operating lever supported by the rear spring;

Fig. 5 is a perspective view of the slotted adjustable portion of the clutch pedal operating link;

Fig. 6 is a fragmentary plan of the carbureter controlling mechanism.

Corresponding and like parts are referred to in the following description and indicated in all the views of the drawings by the same reference characters.

In order to insure a clear and accurate understanding of my invention I have illustrated it in connection with a conventional form of Ford automobile 10 having an engine 11, and a carbureter 12 having a throttle valve lever 13. The transmission mechanism 14 is controlled as usual by a number of foot pedals including the clutch pedal 15 the shank 16 of which is fixed to a gear controlling shaft 17 extending from the transmission mechanism, the free end of the shank projecting below the shaft 17. As is usual with Ford automobiles this pedal normally occupies a rearward position under which circumstance transmission is in high speed position. It may, however, be swung forwardly against the action of the spring to a vertical position in which the transmission is in neutral or to a forward position in which the transmission is in low speed position. Coöperating with this pedal is the usual emergency brake lever 18 which is fixed to the transverse rock-shaft 19 carrying a cam arm 20 which coöperates through a pivot lever 21 with an adjustable link 22 connected to the lower free end of the foot pedal shank 16. This connection is such that when the brake lever 18 is swung to intermediate or vertical position the clutch pedal will be swung to neutral or vertical position, the brakes not being applied unless the brake lever is swung to rearward position.

My present invention includes an attachment having proper connection with the shank of the brake pedal 15, and with the carbureter and supported partially by the brake pedal and partially by the rear semi-elliptic spring 23 of the vehicle. As is usual clevis bolts 24 are passed about the rear transverse frame member 25 which seats the intermediate portion of the spring 23 to secure the frame member to the spring. In order to simplify matters I remove one of the clamping plates 26 coöperating with these clevis bolts and replace it by a combined clamping plate and bracket 27 which is secured by nuts 28 threaded upon the ends of the bolt to which it is applied. This clamping plate extends at one end rearwardly of the spring and is formed with spaced pivot ears 29 which receive a pivot pin 30 which also passes through a radially extending ear 31 formed at one end of a sleeve or socket 32 and which is secured by a cotter pin 33 or equivalent means.

This sleeve 32 at a point diametrically opposite the ear 31 is formed with a radially extending depending lever arm 34, and a draw rod 35 has one end laterally bent and passed loosely through the free end of the lever arm 34 and secured by a cotter pin 36. The opposite end of this draw rod 35 is threaded and passed through the laterally directed terminal 37 of a drag or link or plate 38 which is formed adjacent its free end with a longitudinal slot 39 through which the pivot bolt connecting the link 22 and pedal shank 16 passes, a cotter pin 40 being passed through this pivot bolt to prevent displacement of the parts. Nuts 41 threaded upon the rod 35 against either side of the terminal 37 of the link 38 serve to provide for adjustment in the effective length of the combined draw element formed by the draw rod 35 and link 38.

A helical spring 42 of suitable strength has one end bent to form an eye 43 encircling the shaft 17 and its opposite end bent to provide a hook 44 engaging through an opening 45 formed in the plate 38 near the rear end of the latter. This spring normally serves to hold the parts in the position shown in Fig. 3. Furthermore, a cord or chain, or other flexible element 45 is connected at one end to the rear portion of the link or plate 38 and at its opposite end to a clamp 46 mounted upon a draw rod 47 which has a lateral terminal 48 pivotally connected to the lever 13 of the throttle valve of the carbureter 12, this cord being passed about suitable pulleys 49 to properly support and guide it. Slidably mounted upon the opposite end of the draw rod 47 is a sleeve 50 which has a lateral arm 51 which is pivotally connected to the crank arm 52 upon the throttle control rod 53. A pin 54 prevents displacement of the sleeve 50 although leaving it free for movement with respect to the rod, and a helical spring 55 surrounding the rod and bearing at its ends against the clamp 46 and sleeve normally tends to hold the rod with the pin 54 engaging the sleeve. Obviously, turning of the throttle control rod 53 will act through its crank arm 52 and the sleeve 50 to pull the draw rod 47 and open the throttle valve. This will not, however, in any way interfere with corresponding movement of the draw rod to open the throttle valve through strain exerted upon the cord 45 as the rod may move freely through the sleeve 50 which may then remain stationary. As soon as the cord is slackened it will, of course, be apparent that the rod will be returned to normal position to close the throttle valve.

If in operation the vehicle becomes stuck in a mud hole or in sand to such an extent that the engine alone is incapable of extracting it the operator will swing the hand brake lever to vertical position to release the gears so that the engine may run idly without transmitting any power to the rear axle of the vehicle. The operator will then insert a handle, not shown, as it will usually be the removable handle of a jack, in the sleeve or socket 32 and swing it upwardly at the same time pushing against the rear of the vehicle. The upward swing of this handle will draw the draw rod 35 and link 38 rearwardly to first exert strain upon the cord 45 to open the throttle valve and speed up the engine. Further swinging of the handle will cause the pin 40 to engage in the forward end of the slot 39 so that the clutch pedal 15 will be swung forwardly to bring the transmission in low speed position. Obviously, under these circumstances power will be transmitted to the rear wheels under the best possible conditions to drive the vehicle from the position in which it is and at the same time the operator will be in position to assist the engine by pushing the car. Obviously, as soon as the car has reached firm ground or a good road bed the operator will release the handle causing the clutch pedal to move to neutral position under the action of its spring and consequently causing partial closing of the throttle valve to prevent racing of the engine. This will, of course, cause the car to stop within a short distance when the operator may resume his seat, release the brake lever and continue on his way.

In some instances tire hangers, trunk racks or other devices located at the rear of the car may prevent access to the socket 32. If this is the case a modified form of bracket plate 27' corresponding to the bracket plate 27 will be provided having a bearing sleeve 56 journaling a rock shaft 57 which extends toward the side of the vehicle and near its free end is journaled in a second bearing 58. This rock shaft at its inner end is formed with a crank arm 60 which is pivotally connected to the draw link 35 and at its outer end with a rearwardly directed socket or sleeve corresponding to the sleeve 32 or with a squared portion 61 to receive a wrench or other equivalent tool.

In view of these modifications it will, of course, be understood that I do not wish to restrict myself to the specific features shown but reserve the right to make any changes which may fall within the scope of the appended claims.

Having thus described the invention, what is claimed as new is:

1. The combination with a self propelled vehicle having an element controlling transmission of power, of means operable from the rear of the vehicle for actuating such element.

2. The combination with a motor vehicle including an element adapted in one position to cause transmission of power and in another position to cause stopping of such transmission of power, and means movable to a position to normally hold the element in the latter position, of means operable from the rear of the vehicle for moving the element to the former position.

3. The combination with a motor vehicle including a clutch pedal and hand brake lever movable to hold the clutch pedal in neutral position, of means operable from the rear of the vehicle for moving the clutch pedal to low speed position.

4. The combination with a motor vehicle including a clutch pedal and hand brake lever movable to hold the clutch pedal in neutral position, of means operable from the rear of the vehicle for moving the clutch pedal to low speed position, said means including a manually operable lever swingingly mounted at the rear of the vehicle, and link connection between the lever and clutch pedal.

5. The combination with a motor vehicle having a carbureter, a clutch pedal, and a brake lever adapted in one position to hold the clutch pedal in neutral position, of means operable from the rear of the car for successively opening up the throttle valve of the carbureter and moving the clutch pedal to low speed position.

6. The combination with a motor vehicle having a carbureter, a clutch pedal, and a brake lever adapted in one position to hold the clutch pedal in neutral position, of means operable from the rear of the car for successively opening up the throttle valve of the carbureter and moving the clutch pedal to low speed position, and means operable upon the release of the manual means for returning the parts to normal position.

7. The combination with a motor vehicle having a carbureter, a clutch pedal, and a brake lever adapted in one position to hold the clutch pedal in neutral position, of a link having slotted connection at one end with the clutch pedal, a spring normally holding the link in forward position with respect to the clutch pedal, connecting means between the link and the throttle valve of the carbureter, and means disposed at the rear of the vehicle and operatively connected to the link and capable of being manually swung to draw the link rearwardly.

8. The combination with a motor vehicle having an element controlling transmission of power and movable to neutral position, of means operable from the rear of the vehicle for actuating said element, and means for automatically returning the element to neutral position.

9. The combination with a motor vehicle having an element controlling transmission of power, and a carbureter, of means operable from the rear of the vehicle for actuating said element and controlling the carbureter.

10. The combination with a motor vehicle having an element controlling transmission of power, and a carbureter, of means operable from the rear of the vehicle for actuating said element, and connecting means between the carbureter and said first mentioned means, the said connecting means including a slidably mounted rod engaged with the throttle valve of the carbureter, yieldable means acting upon the said rod to normally close the said valve, and an operative connection between the rod and the said first mentioned means.

11. The combination with a motor vehicle having an element controlling transmission of power, and a carbureter, of means operable from the rear of the vehicle for actuating said element, and connecting means between the carbureter and said first mentioned means, the said connecting means including a slidably mounted rod engaged with the throttle valve of the carbureter, and a flexible element connecting the rod with said first mentioned means.

In testimony whereof I affix my signature.

HENRY EINUNG. [L. S.]

Copies of this patent may be obtained for five cents each, by addressing the "Commissioner of Patents, Washington, D. C."